(No Model.)

J. W. HYATT.
Manufacture of Celluloid.

No. 232,037.  Patented Sept. 7, 1880.

WITNESSES:
Chas. P. Gill
Paris Chalmers

INVENTOR:
John W. Hyatt,
By his attys
Cox and Cox

UNITED STATES PATENT OFFICE.

JOHN W. HYATT, OF NEWARK, NEW JERSEY, ASSIGNOR TO THE CELLULOID MANUFACTURING COMPANY, OF NEW YORK, N. Y.

MANUFACTURE OF CELLULOID.

SPECIFICATION forming part of Letters Patent No. 232,037, dated September 7, 1880.

Application filed May 11, 1880. (No model.)

*To all whom it may concern:*

Be it known that I, JOHN W. HYATT, of Newark, in the county of Essex and State of New Jersey, have invented a new and useful Improvement in Manufactures of Celluloid, of which the following is a specification, reference being had to the accompanying drawings.

The invention relates to an improved process and apparatus for applying coatings or veneers of celluloid and other plastic or elastic materials to moldings and similar articles having uneven surfaces.

Figure 1:
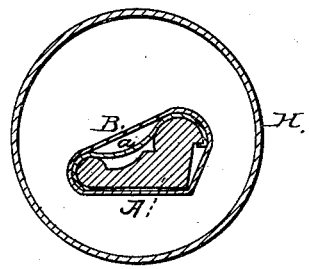
Figure 2:
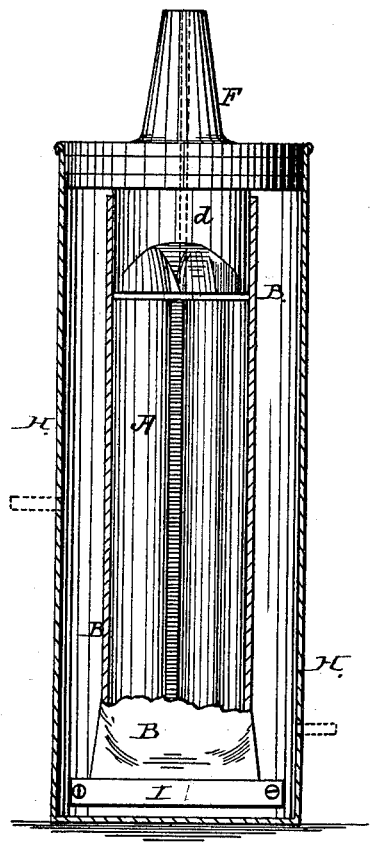

Figure 1 is a central vertical transverse section, showing the molding with a strip of celluloid attached and inserted in a rubber tube preparatory to receiving pressure. Fig. 2 is a central vertical longitudinal section, showing the molding inserted within a rubber tube having the nozzle-block inserted in its end, the whole being inclosed in a circular metallic casing having an inlet and outlet, whereby external pressure may be applied to the rubber tubing.

A denotes the molding before the celluloid or other coating has been applied, which may be of any usual shape or configuration. The superficies of the molding is coated with an appropriate cement or adhesive material, and the strip *a*, of celluloid or other material, temporarily attached to span the face of the molding, the width of the strip being equal to the superficies of the molding desired to be covered, and its interior surface by preference being also coated with an appropriate cement or adhesive material.

The strip may be readily attached by bending the edges so that they will gripe the molding, as shown with sufficient accuracy in Fig. 1.

The molding and strip of celluloid having been adjusted in this way, a rubber tube, B, is passed over them, so as to inclose the entire length of the molding, and, if desired, a block, *d*, may be inserted to hold the parts together.

At one end of the rubber tubing a nozzle, F, may be provided, adapted to be inserted in a vacuum-pump, as shown with sufficient accuracy in Fig. 2.

The parts having been arranged as hereinbefore recited, the nozzle of the tubing is inserted in the pump, upon the actuation of which the tubing will necessarily be drawn with great force toward the molding, thus causing the celluloid or other plastic or elastic material to adapt itself to the form of the molding, in which position it is held by the cement or other adhesive material.

The operation of the pump having been continued for a suitable length of time, the nozzle is removed from the pump and the molding taken out, when it will be found to be in a finished condition, substantially ready for the market.

If desired, exterior pressure may be applied to the rubber tube in order to more firmly compress the veneer or coating to the molding or other article, the vacuum-pump being employed or not, as may be preferred.

H indicates a metallic casing, in which, if desired, the rubber tube B, containing the molding, may be inserted, as shown in the drawings, and external pressure applied, as may be convenient. The lower end of the tube B is, in the present instance, closed in an air-tight manner by a clamp, I.

While I contemplate the use of my process in connection with the application of plastic materials, I do not limit myself to any particular material or substance; neither do I confine myself to any particular article, although I regard my process as being especially efficacious in the manufacture of moldings.

What I claim as my invention, and desire to secure by Letters Patent, is—

1. The within-described process of applying veneers, which consists in first attaching a strip of material to span the face of the article, then inserting the two in an elastic tube, and then contracting the tube by means of a vacuum-pump, or by external pressure or otherwise.

2. The within-described process of applying veneers, which consists in first attaching a strip of material to span the face of the article, then inserting the two, together with a block, in an elastic tube, and then contracting the tube by means of a vacuum-pump, or by external pressure or otherwise, substantially as set forth.

In testimony that I claim the foregoing improvement in manufactures of celluloid, as above described, I have hereunto set my hand this 23d day of April, 1880.

JOHN W. HYATT.

Witnesses:
WM. BRO. SMITH,
CHAS. C. GILL.